(12) United States Patent
Nakamura et al.

(10) Patent No.: US 10,654,340 B2
(45) Date of Patent: May 19, 2020

(54) AIR-CONDITIONING DEVICE

(71) Applicant: CALSONIC KANSEI CORPORATION, Saitama-shi, Saitama (JP)

(72) Inventors: Kojiro Nakamura, Saitama (JP); Tomohiro Maeda, Saitama (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 65 days.

(21) Appl. No.: 16/084,758

(22) PCT Filed: Mar. 7, 2017

(86) PCT No.: PCT/JP2017/009009
§ 371 (c)(1),
(2) Date: Sep. 13, 2018

(87) PCT Pub. No.: WO2017/159455
PCT Pub. Date: Sep. 21, 2017

(65) Prior Publication Data
US 2019/0077225 A1 Mar. 14, 2019

(30) Foreign Application Priority Data

Mar. 14, 2016 (JP) .................................. 2016-049850
Mar. 14, 2016 (JP) .................................. 2016-049859

(51) Int. Cl.
*B60H 1/03* (2006.01)
*B60H 1/22* (2006.01)
(Continued)

(52) U.S. Cl.
CPC ....... *B60H 1/2225* (2013.01); *B60H 1/00921* (2013.01); *B60H 1/03* (2013.01);
(Continued)

(58) Field of Classification Search
CPC ...... B60H 2001/2228; B60H 2001/224; B60H 2001/2246; B60H 2001/2281;
(Continued)

(56) References Cited

U.S. PATENT DOCUMENTS 5,678,761 A 10/1997 Ikeda
2013/0291577 A1 11/2013 Miyakoshi et al.
(Continued)

FOREIGN PATENT DOCUMENTS

JP H08-020226 A 1/1996
JP 2002-067659 A 3/2002
(Continued)

*Primary Examiner* — Filip Zec
(74) *Attorney, Agent, or Firm* — Foley & Lardner LLP

(57) ABSTRACT

An air-conditioning device includes: a heating cycle configured to circulate the heating medium through a heater core, the heater core being configured to heat blown air; an auxiliary heating device configured to heat the heating medium by an electric heater; a refrigeration cycle configured to circulate cooling medium discharged from a compressor through a condenser, the condenser being configured to heat the heating medium; refrigeration cycle control means configured to operate the refrigeration cycle such that temperature of the heating medium reaches target heating-medium temperature; auxiliary heating device control means configured to operate the auxiliary heating device such that the temperature of the heating medium reaches the target heating-medium temperature; and switching means configured to stop the operation of the refrigeration cycle in the state in which the temperature of the heating medium is equal to or higher than the threshold value.

6 Claims, 10 Drawing Sheets

(51) Int. Cl.
*B60H 1/32* (2006.01)
*B60H 1/00* (2006.01)

(52) U.S. Cl.
CPC ......... *B60H 1/2218* (2013.01); *B60H 1/2221* (2013.01); *B60H 1/3213* (2013.01); *B60H 2001/00928* (2013.01); *B60H 2001/00957* (2013.01); *B60H 2001/224* (2013.01); *B60H 2001/2228* (2013.01); *B60H 2001/2246* (2013.01); *B60H 2001/2281* (2013.01); *B60H 2001/2296* (2013.01)

(58) Field of Classification Search
CPC .. B60H 2001/2296; B60H 2001/00928; B60H 2001/00957; B60H 1/2218; B60H 1/2221; B60H 1/2225; B60H 1/3213
See application file for complete search history.

(56) References Cited

U.S. PATENT DOCUMENTS

| | | | |
|---|---|---|---|
| 2016/0185185 A1 | 6/2016 | Suzuki et al. | |
| 2016/0361974 A1* | 12/2016 | Porras | B60H 1/00899 |
| 2019/0023100 A1* | 1/2019 | Suzuki | F25B 41/043 |
| 2019/0070924 A1* | 3/2019 | Mancini | B60H 1/00278 |

FOREIGN PATENT DOCUMENTS

| | | |
|---|---|---|
| JP | 2003-118355 A | 4/2003 |
| JP | 2005-061364 A | 3/2005 |
| JP | 2009-280020 A | 12/2009 |
| JP | 2012-176658 A | 9/2012 |
| JP | 2014-213765 A | 11/2014 |

* cited by examiner

| | |
|---|---|
| TARGET BLOWOUT TEMPERATURE Ttarget FOR COMPUTATION | SETTING MADE SUCH THAT TEMPERATURE IN VEHICLE CABIN IS MAINTAINED AT SET TEMPERATURE |
| TARGET BLOWOUT TEMPERATURE To FOR CONTROL | UPPER LIMIT VALUE (80 °C) IS SET FOR TARGET BLOWOUT TEMPERATURE Ttarget |
| TARGET HEATING-MEDIUM TEMPERATURE Two | CALCULATED BASED ON TARGET BLOWOUT TEMPERATURE To<br>Two = To + Cw |
| TARGET COOLING-MEDIUM-PRESSURE Po | SET TO PRESSURE SUCH THAT SATURATION TEMPERATURE OF COOLING MEDIUM BECOMES TARGET VALUE Trefo<br>Trefo = Two + Cref |
| THRESHOLD VALUE OF HEATING-MEDIUM TEMPERATURE Tw FOR STOPPING OPERATION OF REFRIGERATION CYCLE | 62°C |

FIG.3

| | |
|---|---|
| TARGET BLOWOUT TEMPERATURE Ttarget FOR COMPUTATION | SETTING MADE SUCH THAT TEMPERATURE IN VEHICLE CABIN IS MAINTAINED AT SET TEMPERATURE |
| TARGET BLOWOUT TEMPERATURE To FOR CONTROL | UPPER LIMIT VALUE (80 °C) IS SET FOR TARGET BLOWOUT TEMPERATURE Ttarget |
| TARGET HEATING-MEDIUM TEMPERATURE Two | CALCULATED BASED ON TARGET BLOWOUT TEMPERATURE To<br>Two = To + Cw<br>SET UPPER LIMIT VALUE (82 °C) |
| TARGET COOLING-MEDIUM-PRESSURE Po | SET TO PRESSURE SUCH THAT SATURATION TEMPERATURE OF COOLING MEDIUM BECOMES TARGET VALUE Trefo<br>Trefo = Two + Cref |
| THRESHOLD VALUE OF TARGET HEATING-MEDIUM TEMPERATURE Two FOR STARTING OPERATION OF REFRIGERATION CYCLE | 62°C |
| THRESHOLD VALUE OF HEATING-MEDIUM TEMPERATURE Tw FOR STOPPING OPERATION OF REFRIGERATION CYCLE | 62°C |

FIG.8

AIR-CONDITIONING DEVICE

CROSS-REFERENCE TO RELATED APPLICATIONS

This application is a National Phase of International Patent Application No. PCT/JP2017/009009, filed Mar. 7, 2017, which claims priority to Japanese Patent Application No. 2016-049859, filed Mar. 14, 2016 and Japanese Patent Application No. 2016-049850, filed Mar. 14, 2016. The contents of these applications are herein incorporated by reference in their entirety.

TECHNICAL FIELD

The present invention relates to an air-conditioning device that adjusts temperature of blown air.

BACKGROUND ART

JP2009-280020A discloses an air-conditioning device that includes: a thermal fluid heater that heats blown air to be blown into a vehicle cabin; an electric heater that heats heating medium circulating through the thermal fluid heater; and a heat pump that circulates cooling medium through a cooling medium/heating medium heat exchanger that heats the heating medium.

With the above-described air-conditioning device, at the cabin-heating time when the outside-air temperature is about 0° C., the cabin heating is performed at high-power by operating both of the electric heater and the heat pump. On the other hand, at the cabin-heating time when the outside-air temperature is higher than 0° C., the cabin heating is performed at low-power by stopping the operation of the electric heater and by operating the heat pump only.

SUMMARY OF INVENTION

However, with the air-conditioning device disclosed in JP2009-280020A, because the electric heater is operated only when the outside-air temperature is low, the electric heater may stop in a state in which the heating medium is not heated sufficiently. So, the cabin heating may not be performed rapidly.

An object of the present invention is to provide an air-conditioning device capable of performing cabin heating rapidly.

According to one aspect of the present invention, an air-conditioning device includes: a heating cycle that circulates heating medium through a heater core, the heater core that heats blown air; an auxiliary heating device that heats the heating medium by an electric heater; a refrigeration cycle that circulates cooling medium discharged from a compressor through a condenser, the condenser that heats the heating medium; refrigeration cycle control means that operates the refrigeration cycle such that temperature of the heating medium reaches target heating-medium temperature; an auxiliary heating device control means that operates the auxiliary heating device such that the temperature of the heating medium reaches the target heating-medium temperature; and switching means that stops the operation of the refrigeration cycle in a state in which the temperature of the heating medium is equal to or higher than a threshold value.

According to the above-mentioned aspect, the auxiliary heating device and the refrigeration cycle are operated when the amount of heat intended to achieve the target heating-medium temperature cannot be provided only by the heating by the refrigeration cycle. When the temperature of the heating medium is increased so as to reach or exceed the threshold value and the refrigeration cycle reaches a low-efficiency state, the operation of the refrigeration cycle is stopped and the cabin heating is performed by operating the auxiliary heating device. Therefore, it is possible to perform the cabin heating rapidly.

BRIEF DESCRIPTION OF DRAWINGS

FIG. 3 is a table showing a target value used for controlling the air-conditioning device.

FIG. 8 is a table showing a target value used for controlling the air-conditioning device according to a modification of the embodiment of the present invention.

DESCRIPTION OF EMBODIMENTS

Figure 1:
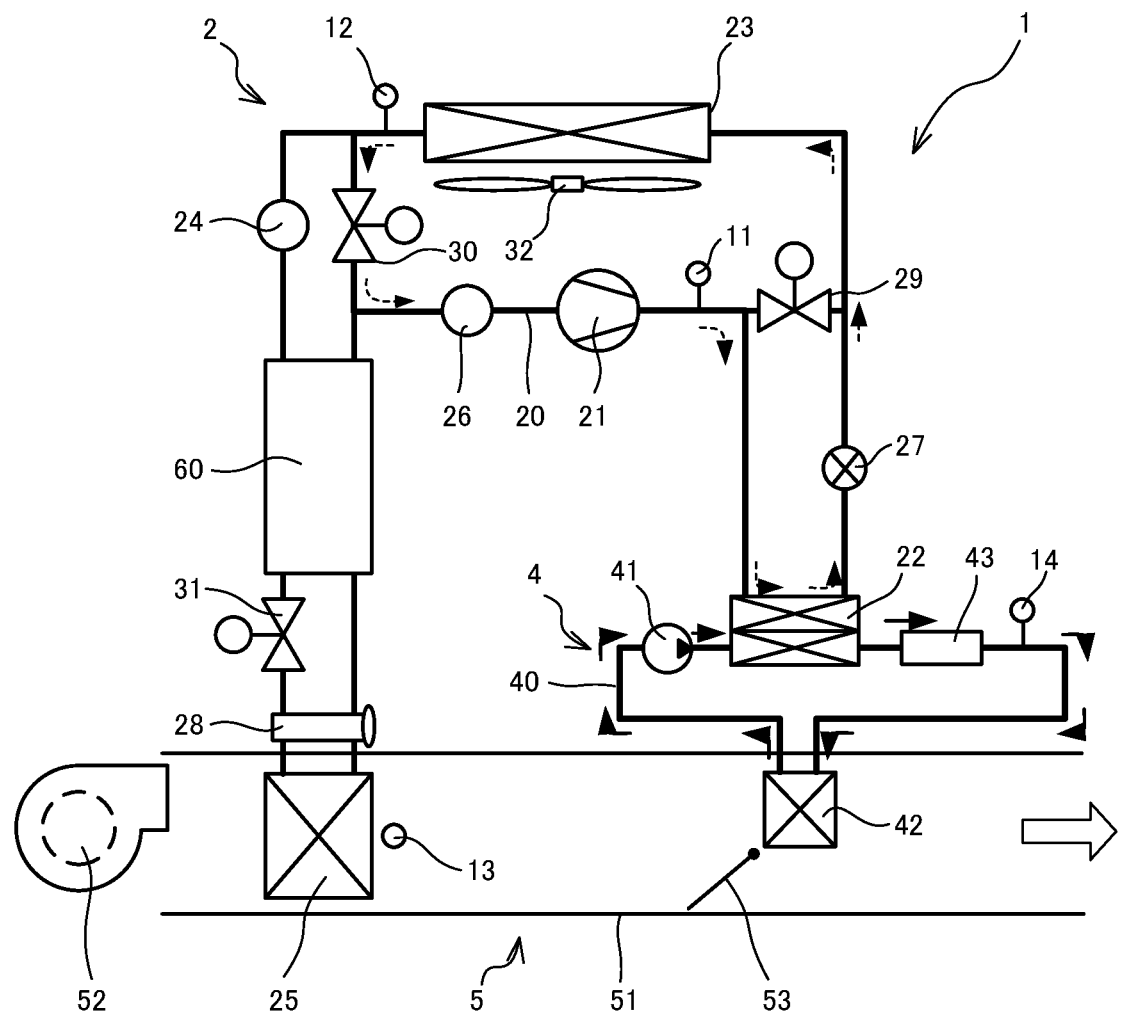
FIG. 1 is a schematic configuration diagram showing an air-conditioning device according to an embodiment of the present invention.

An air-conditioning device 1 according to an embodiment of the present invention will be described below with reference to the attached drawings. FIG. 1 is a schematic configuration diagram showing the air-conditioning device 1.

The air-conditioning device 1 is a heat pump system capable of performing cabin cooling and cabin heating. The air-conditioning device 1 includes a refrigeration cycle 2 through which cooling medium circulates, a heating cycle 4 through which heating medium circulates, an HVAC (Heating Ventilation and Air Conditioning) unit 5 through which air used for air-conditioning passes, and a controller 10 (see FIG. 2) for controlling operation of valves etc. The cooling medium, such as HFC-134a, is used as a medium circulating through the refrigeration cycle 2. The heating medium, such as antifreeze (cooling water), is used as the liquid medium circulating through the heating cycle 4. The liquid medium circulating through the heating cycle 4 is not limited thereto, and other liquids such as oil etc. may also be used.

The refrigeration cycle 2 includes a compressor 21 (compressor), a condenser 22, a first expansion valve 27, an external heat exchanger 23, a liquid tank 24, an internal heat exchanger 60, a second expansion valve 28, an evaporator 25, an accumulator 26, and a cooling medium flow path 20 that connects these components such that the cooling medium can circulate therethrough.

The compressor 21 is driven by an electric motor (not shown). The compressor 21 compresses and discharges the cooling medium circulating through the cooling medium flow path 20.

The condenser 22 is a heat exchanger that performs heat exchange between the cooling medium circulating through the refrigeration cycle 2 and the heating medium circulating through the heating cycle 4.

The external heat exchanger 23 is provided in an engine compartment of a vehicle, for example (in a motor compartment of an electric car), and performs the heat exchange between the cooling medium and outside air. The external heat exchanger 23 is arranged such that wind caused by a travelling vehicle or wind forcedly sent by an external fan 32 passes through a heat exchange portion. The external fan 32 is driven by the electric motor (not shown).

At the cabin-cooling time, the liquid tank 24 temporarily stores the cooling medium that has passed through the external heat exchanger 23 and that has been condensed. The liquid tank 24 performs gas/liquid separation of the cooling medium into the gaseous the cooling medium and the liquid cooling medium.

The internal heat exchanger 60 performs the heat exchange between the cooling medium flowing on the upstream side of the second expansion valve 28 and the cooling medium flowing on the downstream side of the evaporator 25 in the cooling medium flow path 20.

The evaporator 25 is provided in the HVAC unit 5. The evaporator 25 is a heat exchanger that cools blown air by performing the heat exchange between the cooling medium and the blown air flowing in the HVAC unit 5.

The accumulator 26 temporarily stores the cooling medium flowing in the cooling medium flow path 20 and performs the gas/liquid separation of the cooling medium into the gaseous cooling medium and the liquid cooling medium.

The first expansion valve 27 is provided between the condenser 22 and the external heat exchanger 23 in the cooling medium flow path 20. At the first expansion valve 27, the cooling medium that has been condensed at the condenser 22 is decompressed and expanded. The first expansion valve 27 is a fixed restrictor (orifice) or a variable restrictor (solenoid valve), for example.

The second expansion valve 28 is provided between the internal heat exchanger 60 and the evaporator 25 in the cooling medium flow path 20. At the second expansion valve 28, the cooling medium that has been condensed by passing through the external heat exchanger 23 and the internal heat exchanger 60 is decompressed and expanded. The second expansion valve 28 is a thermostatic expansion valve. An opening degree of the thermostatic expansion valve is adjusted on the basis of the temperature of the cooling medium that has passed through the evaporator 25.

The cooling medium flow path 20 is provided with a first open/close valve 29, a second open/close valve 30, and a third open/close valve 31. The first open/close valve 29, the second open/close valve 30, and the third open/close valve 31 are respectively opened/closed by the controller 10 so as to switch the flow of the cooling medium. At the cabin-heating time, the first open/close valve 29 and the third open/close valve 31 are closed, and the second open/close valve 30 is opened. At the cabin-cooling time, the first open/close valve 29 and the third open/close valve 31 are opened, and the second open/close valve 30 is closed.

The heating cycle 4 includes a water pump 41, the condenser 22, an auxiliary heating device 43, a heater core 42, and a heating medium flow path 40 that connects these components such that the heating medium can circulates therethrough. The auxiliary heating device 43 is provided on the immediate downstream side of the condenser 22, and the heater core 42 is provided on the immediate downstream side of the auxiliary heating device 43 in the heating medium flow path 40.

The water pump 41 circulates the heating medium in the heating medium flow path 40 in the direction shown by solid arrows in FIG. 1. The water pump 41 is driven by the electric motor (not shown).

The heater core 42 is provided in the HVAC unit 5. The heater core 42 is a heat exchanger that heats the blown air by performing the heat exchange between the heating medium and the blown air flowing through the HVAC unit 5.

The auxiliary heating device 43 heats the heating medium, which circulates through the heating medium flow path 40, by electric power. An electric heater (not shown) is provided in the auxiliary heating device 43. As the electric heater, for example, a sheathed heater or a PTC (Positive Temperature Coefficient) heater is used.

The HVAC unit 5 cools/heats the blown air used for the air-conditioning. The HVAC unit 5 includes a blower 52 that sends the air, the evaporator 25, the heater core 42, and an air mix door 53 that adjusts the amount of air flowing along the heater core 42.

The blower 52 is a blower that sends the air into the HVAC unit 5. The blower 52 is driven by the electric motor (not shown).

The air mix door 53 opens the heater core 42 side at the cabin-heating time, and closes the heater core 42 side at the cabin-cooling time. Depending on the degree of opening of the air mix door 53, the amount heat exchanged between the blown air and the heating medium in the heater core 42 is adjusted.

The controller 10 is switched to a cabin cooling mode at the cabin-cooling time and switched to a cabin heating mode at the cabin-heating time, thereby controlling the refrigeration cycle 2, the heating cycle 4, and the HVAC unit 5.

Next, the operation of the air-conditioning device 1 in the cabin heating mode and the cabin cooling mode will be described.

<Cabin Heating Mode>

In the refrigeration cycle 2, the cooling medium circulates through the cooling medium flow path 20 as shown by broken arrows in FIG. 1. The cooling medium that has been compressed and the temperature of which has been increased in the compressor 21 is sent to the condenser 22. In the condenser 22, the heat of the high-temperature high-pressure cooling medium from the compressor 21 is transferred to the heating medium. The cooling medium the temperature of which has been decreased by passing through the condenser 22 is decompressed and expanded by passing through the first expansion valve 27. Thereby, the temperature of the cooling medium is further decreased, and then, the cooling medium is sent to the external heat exchanger 23. In the external heat exchanger 23, the low-temperature cooling medium is heated by absorbing the heat of the outside air. The thus-heated cooling medium is sent to compressor 21 via the accumulator 26, thereby circulating through the refrigeration cycle 2. As described above, in the refrigeration cycle 2, a heat pump operation in which the cooling medium absorbs the heat of the outside air and releases the heat to the heating medium circulating through the heating cycle 4 is performed.

On the other hand, in the heating cycle 4, the heating medium circulates through the heating medium flow path 40 as shown by the soled arrows in FIG. 1, and the heating medium is heated by the condenser 22 and the auxiliary heating device 43. The heated heating medium flows within the heater core 42 to heat the blown air.

In the HVAC unit 5, as shown by an open arrow in FIG. 1, the blown air that has been heated by passing through the heater core 42 is sent into a vehicle cabin, and thereby, the cabin heating is performed.

<Cabin Cooling Mode>

In the cabin cooling mode, the first open/close valve 29 and the third open/close valve 31 are opened, and the second open/close valve 30 is closed. By doing so, the cooling medium that has been compressed and the temperature of which has been increased in the compressor 21 is sent to the external heat exchanger 23. In the external heat exchanger 23, the heat of the cooling medium is released to the outside air. The cooling medium that has passed through the external heat exchanger 23 is decompressed and expanded by passing through the second expansion valve 28. Thereby, the temperature of the cooling medium is further decreased, and then, the cooling medium is sent to the evaporator 25. In the evaporator 25, the blown air is cooled by the low-temperature cooling medium. The cooling medium that has been evaporated and gasified by passing through the evaporator 25 is heated by passing through the internal heat exchanger 60, and thereafter, the cooling medium circulates through refrigeration cycle 2 by being sent to the compressor 21 via the accumulator 26. As described above, in the refrigeration cycle 2, the heat pump operation in which the circulating cooling medium absorbs the heat of the blown air sent into the vehicle cabin and releases the heat to the outside air is performed.

In the HVAC unit 5, the blown air that has been cooled by passing through the evaporator 25 is sent into the vehicle cabin, and thereby, the cabin cooling is performed.

After water vapor in the air is condensed and removed by cooling the air by the evaporator 25, the air can be reheated by the heater core 42, and thereby, dehumidified wind can be obtained (cabin dehumidificating-heating mode).

In the cooling medium flow path 20 on the discharge side of the compressor 21, a discharge pressure sensor 11 is provided. The discharge pressure sensor 11 detects pressure P of the cooling medium that has been compressed by the compressor 21.

An external-heat-exchanger-outlet temperature sensor 12 is provided in the vicinity of an outlet of the external heat exchanger 23 in the cooling medium flow path 20. The external-heat-exchanger-outlet temperature sensor 12 detects the temperature of the cooling medium that has passed through the external heat exchanger 23. The external-heat-exchanger-outlet temperature sensor 12 may also be provided at an outlet of the external heat exchanger 23.

An evaporator temperature sensor 13 is provided on the downstream side of the evaporator 25 in the HVAC unit 5. The evaporator temperature sensor 13 detects temperature T of the blown air that has passed through the evaporator 25. The evaporator temperature sensor 13 may also be provided within the evaporator 25.

A water temperature sensor 14 is provided in the vicinity of an outlet of the auxiliary heating device 43 in the heating medium flow path 40 and detects temperature Tw of the heating medium that has passed through the auxiliary heating device 43.

Figure 2:
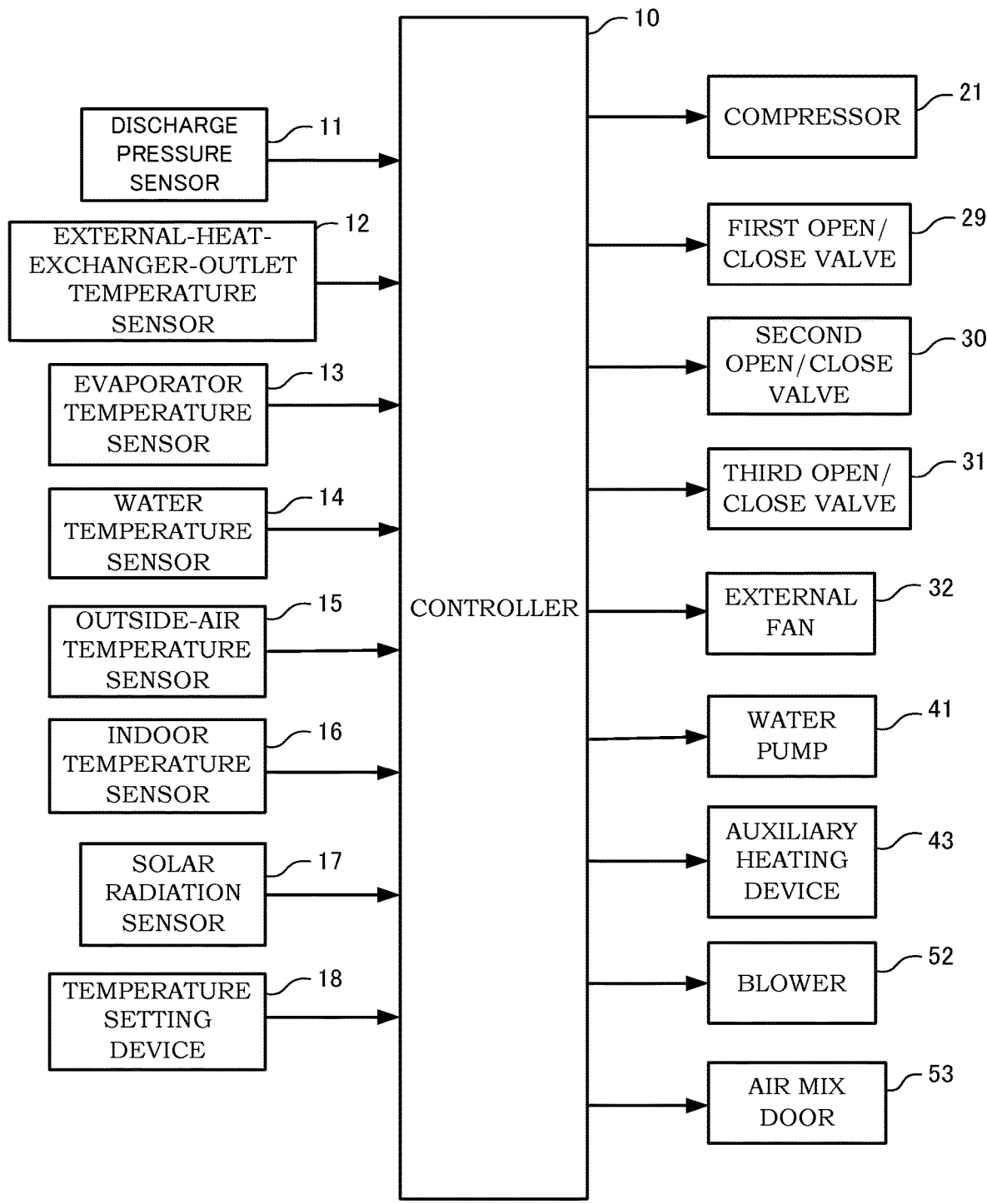
FIG. 2 is a block diagram of an electric circuit of the air-conditioning device.

FIG. 2 is a block diagram showing a configuration of an electric circuit for the controller 10. The controller 10 is a microcomputer including a CPU (Central Processing Unit), a ROM (Read Only Memory), a RAM (Random Access Memory), and so forth. The controller 10 may also be configured with a plurality of microcomputers. With the controller 10, various functions of the air-conditioning device 1 are exhibited by reading out programs stored in the ROM with the CPU. Signals from various sensors 11 to 17 and a temperature setting device 18 are input to the controller 10. The controller 10 performs, on the basis of the input signals, to control of respective operations of the auxiliary heating device 43, the compressor 21, the water pump 41, the blower 52, the first open/close valve 29, the second open/close valve 30, the third open/close valve 31, and the air mix door 53.

Figure 5:
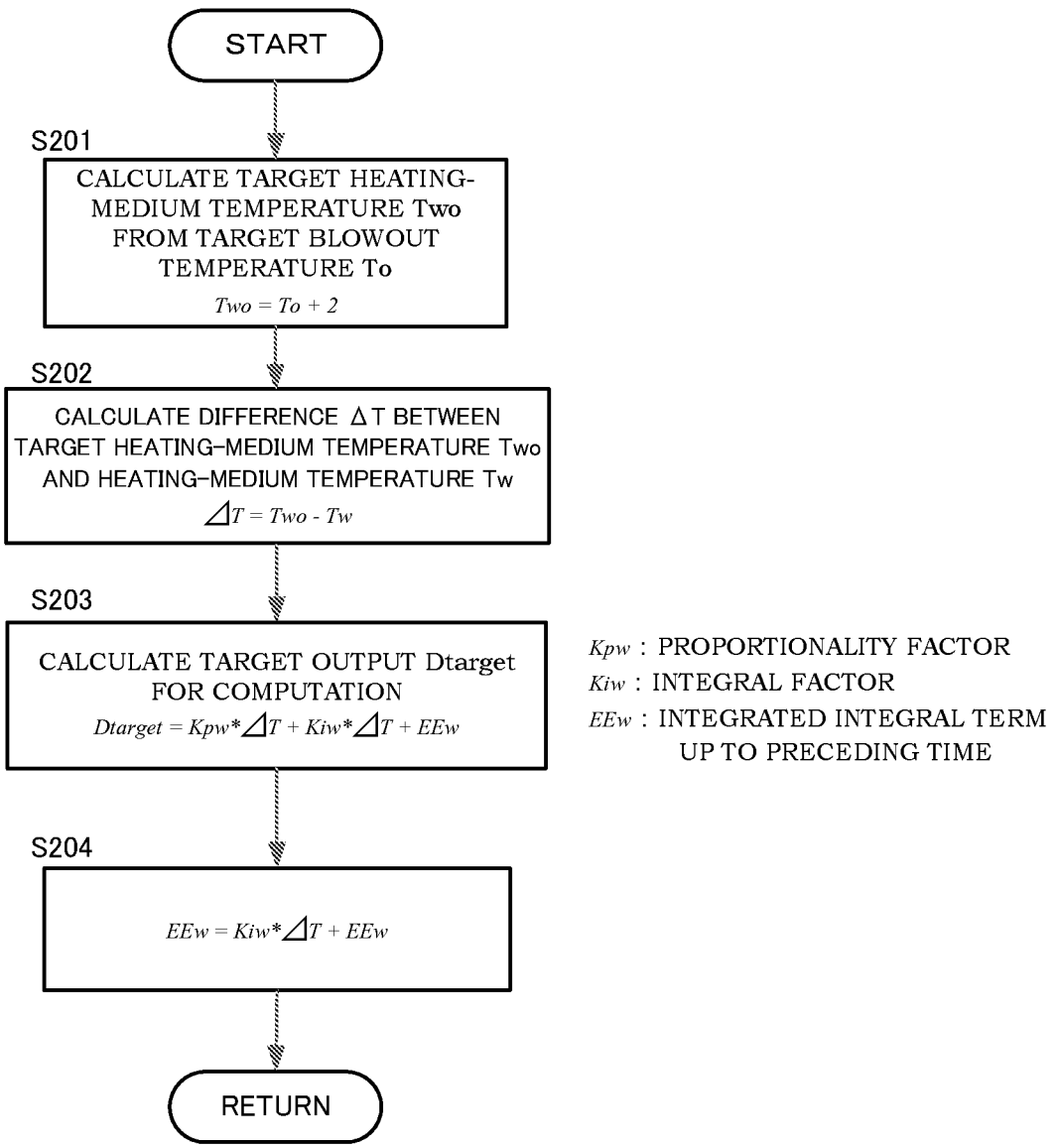
FIG. 5 is a flowchart showing control processing of an auxiliary heating device of the air-conditioning device.

In the cabin heating mode, the controller 10 performs a feedback control of the output of the auxiliary heating device 43 such that the temperature Tw of the heating medium circulating the heating cycle 4 approaches a target heating-medium temperature Two (see FIG. 5). The controller 10 then performs the feedback control of the output of the refrigeration cycle 2 (the compressor 21) such that the temperature Tw of the heating medium approaches the target heating-medium temperature Two (see FIG. 6).

As shown in a table in FIG. 3, in the controller 10, as target values used for controlling the outputs of the auxiliary heating device 43 and the refrigeration cycle 2, target blowout temperature Ttarget for computation, target blowout temperature To for control, the target heating-medium temperature Two, and target cooling-medium-pressure Po are set respectively.

The target blowout temperature Ttarget for computation is the target value for the blowout temperature T of the air sent from the HVAC unit 5 into the vehicle cabin and is set such that the temperature in the vehicle cabin is maintained at the temperature set by the temperature setting device 18 as the operating condition. The target blowout temperature Ttarget is calculated, as the operating condition, on the basis of the outside-air temperature detected by an outside-air temperature sensor 15, the indoor temperature detected by an indoor temperature sensor 16, and the amount of solar radiation detected by a solar radiation sensor 17.

The target blowout temperature To for control is the value at which a predetermined upper limit value (for example 80° C.) is set for the target blowout temperature Ttarget. As described below, the upper limit value of 80° C. is set such that the compression ratio of the cooling medium by the compressor 21 exceeds the upper limit value.

The target heating-medium temperature Two is the target value of the temperature of the heating medium circulating the heating cycle 4. The target heating-medium temperature Two is calculated using following numerical equation (1) on the basis of the target blowout temperature To.

$$Two = To + Cw \tag{1}$$

Wherein, Cw is a constant and is set at 2° C., for example. Because the upper limit value of the target blowout temperature To is set at 60° C., the upper limit value of the target heating-medium temperature Two is set at 62° C.

The target cooling-medium-pressure Po is the target value of the pressure P of the cooling medium discharged from the compressor 21. The target cooling-medium-pressure Po is the pressure at which the target value Trefo of the saturation temperature of the cooling medium flowing into the condenser 22 is achieved. The target cooling medium temperature Trefo is calculated using following numerical equation (2) on the basis of the target heating-medium temperature Two (the target blowout temperature To).

$$Trefo = Two + Cref \tag{2}$$

Wherein, Cref is a constant and is set at 5° C., for example. Because the target heating-medium temperature Two is set at 62° C., the upper limit value of the target value Trefo of target cooling medium temperature (target cooling-medium-pressure) is set at 67° C.

The configuration of the controller 10 is not limited to that in which the feedback control is performed on the operation of the refrigeration cycle 2 on the basis of detected value P of the discharge pressure sensor 11. For example, the controller 10 may be configured such that a discharge temperature sensor (not shown) that detect the temperature of the cooling medium discharged from the compressor 21, and the feedback control is performed on the operation of the refrigeration cycle 2 on the basis of the detected value of the discharge temperature sensor.

At the time of operation in which the cooling medium temperature Tref is increased to exceed a predetermined value (for example 67° C.), because the compression ratio of the cooling medium by the compressor 21 exceeds the upper limit value and becomes excessively high, a low-efficiency state in which the efficiency of the refrigeration cycle 2 (a ratio of the cabin heating power with respect to the input) becomes lower than the efficiency of the auxiliary heating device 43 is established. In an operating state in which the temperature Tw of the heating medium is increased to exceed a predetermined value (for example 62° C.), there is a risk in that the cooling medium temperature Tref is increased to exceed a predetermined value (for example 67° C.), and the refrigeration cycle 2 reaches the low-efficiency state.

Thus, in the controller 10, the threshold value of 62° C. for the temperature Tw of the heating medium at which a determination is made to stop the operation of the refrigeration cycle 2 is set. The controller 10 is configured such that the operation of the refrigeration cycle 2 is prohibited when it is determined that the temperature Tw of the heating medium is increased to exceed the threshold value of 62° C.

Figure 4:
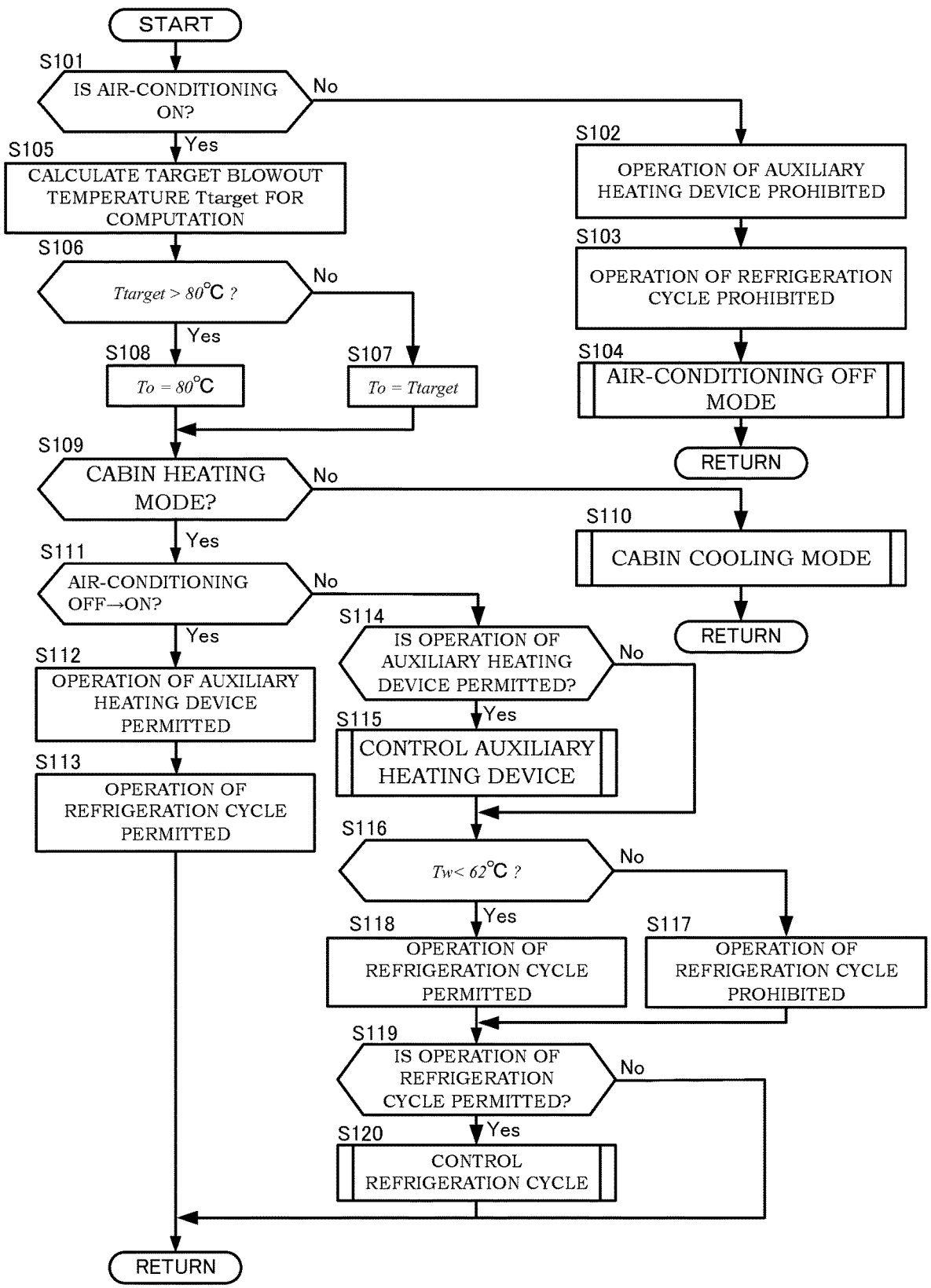
FIG. 4 is a flowchart showing control processing for switching operation mode of the air-conditioning device.

Next, a routine for switching operation mode of the air-conditioning device 1 executed by the controller 10 will be described by using a flowchart shown in FIG. 4. This control routine corresponds to a switching means that switches the operation mode on the basis of the operation condition. This control routine is started when an ignition switch of a vehicle (not shown) is turned on and electricity is supplied to the controller 10. This control routine is executed at every predetermined cycles.

In Step S101, it is determined whether or not an air-conditioning switch (not shown) for operating the air-conditioning device 1 is turned on. When it is determined that the air-conditioning switch is turned off, the processing proceeds to Step S102, and the operation of the auxiliary heating device 43 is prohibited. Next, the processing proceeds to Step S103, and the operation of the refrigeration cycle 2 is prohibited. Next, the processing proceeds to Step S104, and the mode is switched to an air-conditioning OFF mode. As described above, a state in which the operation of the air-conditioning device 1 is stopped is maintained.

On the other hand, when it is determined that the air-conditioning switch is turned on in Step S101, the processing proceeds to Step S105, and the target blowout temperature Ttarget for computation is calculated on the basis of the detected values of the outside-air temperature sensor 15, the indoor temperature sensor 16, and the solar radiation sensor 17.

Next, the processing proceeds to Steps S106 to 108, and the target blowout temperature To for control is obtained on the basis of the target blowout temperature Ttarget. In Step S106, when it is determined that the target blowout temperature Ttarget is higher than the upper limit value of 80° C., the processing proceeds to Step S108, and the target blowout temperature To is set to the upper limit value of 80° C. On the other hand, when it is determined that the target blowout temperature Ttarget is equal to or lower than the upper limit value of 60° C., the processing proceeds to Step S107, and the target blowout temperature To is set to Ttarget.

Next, the processing proceeds to Step S109, and it is determined whether or not the mode is set to the cabin heating mode or the cabin cooling mode on the basis of set conditions. When it is determined that the mode is set to the cabin cooling mode, the processing proceeds to Step S110, and the operation of the air-conditioning device 1 is switched to the cabin cooling mode. In the cabin cooling mode, the refrigeration cycle 2 is operated by another control routine (not shown), and the cabin cooling in the vehicle cabin is performed.

On the other hand, when it is determined that the mode is set to the cabin heating mode in Step S109, the processing proceeds to Step S111 and following steps, and the processing for the cabin heating mode is performed.

In the cabin heating mode, the processing proceeds to Step S111, and it is determined whether or not it is the cabin-heating starting time at which the air-conditioning OFF mode is switched to an air-conditioning ON mode. In the air-conditioning OFF mode, the operation of the air-conditioning device 1 is stopped. In an air-conditioning ON mode, the air-conditioning device 1 is operated. When it is determined that it is the cabin-heating starting time, the processing proceeds to Step S112, and the operation of the auxiliary heating device 43 is permitted. Next, the processing proceeds to Step S113, and the operation of the refrigeration cycle 2 is permitted.

On the other hand, when it is determined that it is the cabin-heating time by which the cabin heating has already been started in Step S111, the processing proceeds to Step S114 to determine whether or not the operation of the auxiliary heating device 43 is permitted, and the processing proceeds to Step S115 to control the operation of the auxiliary heating device 43 (see FIG. 5).

Next, the processing proceeds to Step S116, and it is determined whether or not the temperature Tw of the heating medium is lower than the threshold value (62° C.). When it is determined that the temperature Tw of the heating medium is equal to or higher than the threshold value (62° C.), the processing proceeds to Step S117, and the operation of the refrigeration cycle 2 is prohibited.

On the other hand, when it is determined that the temperature Tw of the heating medium is lower than the threshold value (62° C.) in Step S116, the processing proceeds to Step S118, and the operation of the refrigeration cycle 2 is permitted.

Figure 6:
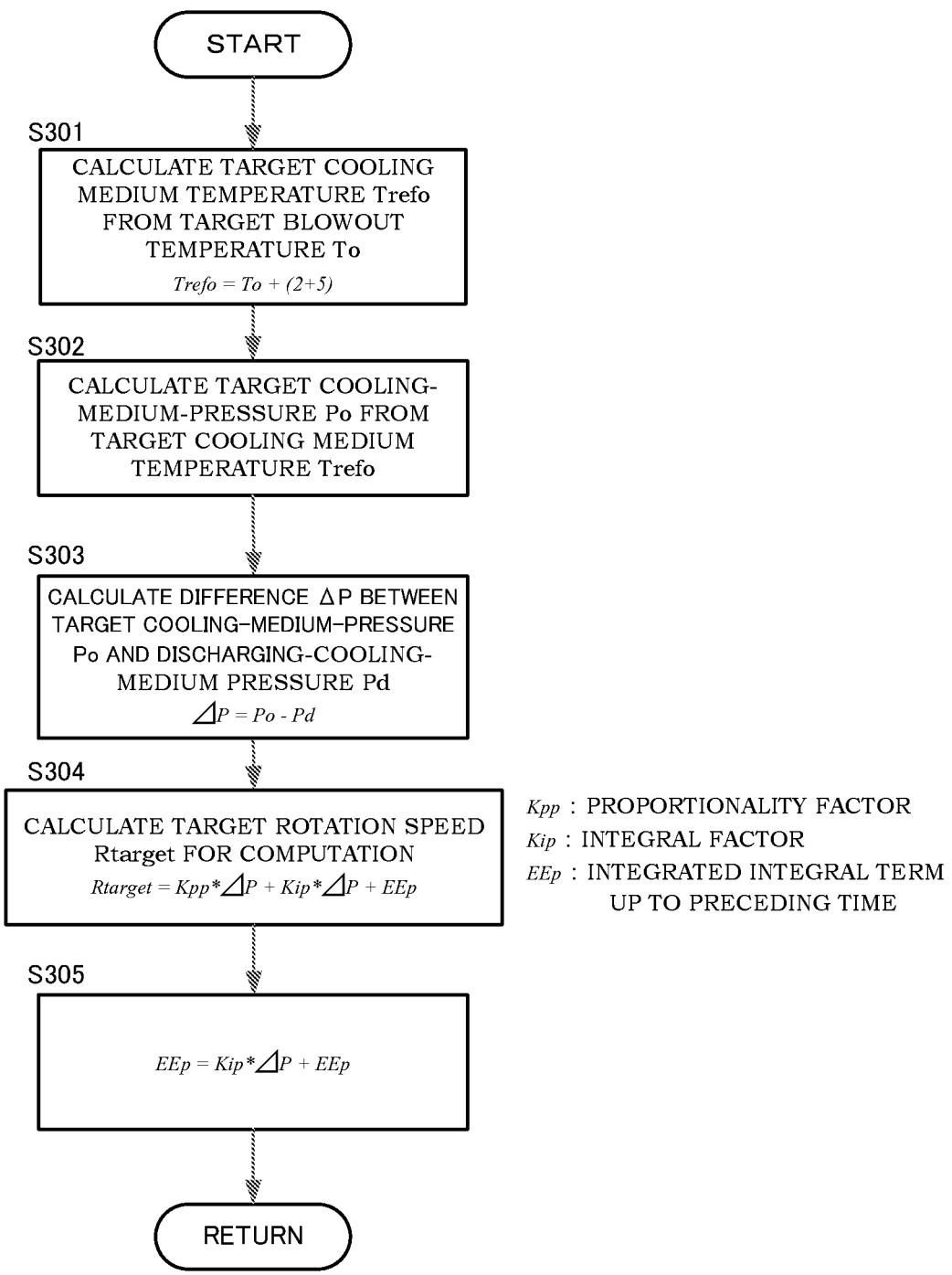
FIG. 6 is a flowchart showing control processing of a refrigeration cycle of the air-conditioning device.

Next, the processing proceeds to Step S119 to determine whether or not the operation of the compressor 21 is permitted, and the processing proceeds to Step S120 to control the operation of the refrigeration cycle 2 (see FIG. 6).

By executing the above-mentioned control routine, the operation mode of the air-conditioning device 1 is switched on the basis of the operation condition.

Next, the routine for controlling the output of the auxiliary heating device executed by the controller 10 will be described by using a flowchart shown in FIG. 5. This control routine corresponds to an auxiliary heating device control means that operates the auxiliary heating device 43 such that the temperature Tw of the heating medium reaches the target heating-medium temperature Two. This control routine is executed at every predetermined cycles.

In Step S201, the target heating-medium temperature Two is calculated from the target blowout temperature To for control by using the numerical equation (1) (see FIG. 3).

Next, the processing proceeds to Step S202, and difference ΔT between the target heating-medium temperature Two and the temperature Tw of the heating medium is calculated by using following numerical equation (3).

$$\Delta T = Two - Tw \quad (3)$$

Next, the processing proceeds to Step S203, and target output Dtarget for computation is calculated by using following numerical equation (4).

$$Dtarget = Kpw^* \Delta T + Kiw^* \Delta T + EEw \quad (4)$$

Wherein, Kpw is a proportionality factor, Kiw is an integral factor, and EEw is an integrated integral term up to the preceding time.

Next, the processing proceeds to Step S204, and integrated integral term EEw at this time is written over the integrated integral term up to the preceding time by using following numerical equation (5).

$$EEw = Kiw^* \Delta T + EEw \quad (5)$$

By executing the above-mentioned control routine, the feedback control is performed on the output of the auxiliary heating device 43 such that the temperature Tw of the heating medium approaches the target heating-medium temperature Two gradually.

Next, the routine for controlling the output of the refrigeration cycle 2 (the compressor 21) executed by the controller 10 will be described by using a flowchart shown in FIG. 6. This control routine corresponds to a refrigeration cycle control means that operates the refrigeration cycle 2 such that the temperature Tw of the heating medium reaches the target heating-medium temperature Two. This control routine is executed at every predetermined cycles.

In Step S301, the target cooling medium temperature Trefo is calculated from the target blowout temperature To for control by using the numerical equation (2) (see FIG. 3).

Next, the processing proceeds to Step S302, and the target cooling-medium-pressure Po is calculated from the target cooling medium temperature Trefo.

Next, the processing proceeds to Step S303, and the difference ΔT between the target cooling-medium-pressure Po and discharging-cooling-medium pressure Pd detected by the discharge pressure sensor 11 is calculated by using following numerical equation (6).

$$\Delta T = Po - Pd \quad (6)$$

Next, the processing proceeds to Step S304, and target rotation speed Rtarget for computation is calculated by using following numerical equation (7).

$$Rtarget = Kpp^* \Delta P + Kip^* \Delta P + EEp \quad (7)$$

Wherein, Kpp is a proportionality factor, Kip is an integral factor, and EEp is the integrated integral term up to the preceding time.

Next, the processing proceeds to Step S304, and the integrated integral term EEw at this time is written over the integrated integral term up to the preceding time by using following numerical equation (8).

$$EEp = Kip^* \Delta P + EEp \quad (8)$$

By executing the above-mentioned control routine, the rotation speed (output) of the compressor 21 is controlled such that the temperature Tw of the heating medium approaches the target heating-medium temperature Two.

Figure 7:
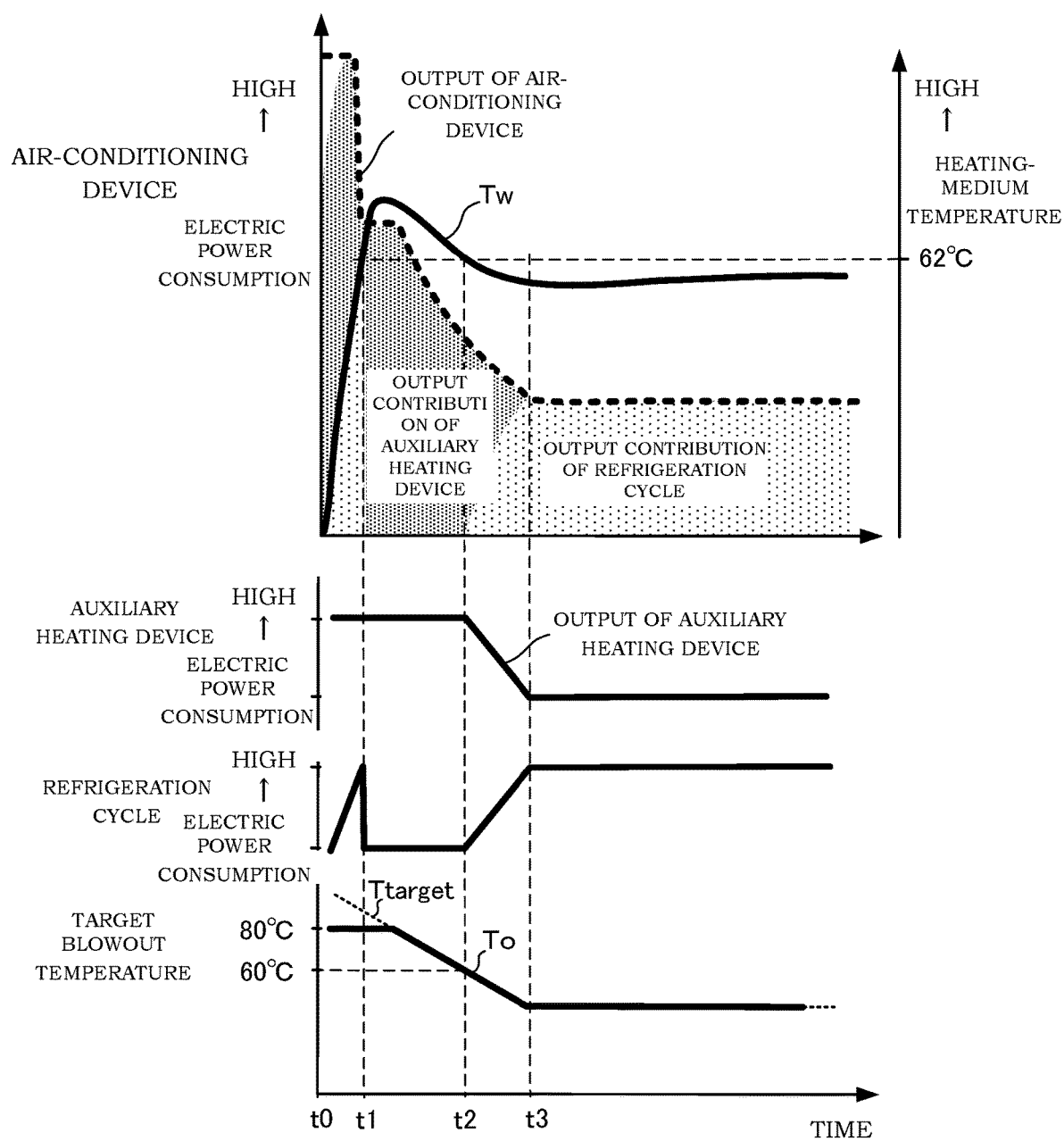
FIG. 7 is a time chart showing an exemplary control of the air-conditioning device.

Next, an operation performed in the case in which the air-conditioning device 1 starts a cabin-heating operation when the outside temperature is low will be described by using a time chart shown in FIG. 7.

At Time t0 in the time chart, the cabin-heating operation of the air-conditioning device 1 is started in the cabin heating mode. At the time of starting the operation, because the blowout temperature T of the blown air and the temperature Tw of the heating medium are both low, high cabin heating power is required. In order to cope with such a situation, the target blowout temperature Ttarget for computation is set so as to be a value higher than the upper limit value of 80° C. However, the target blowout temperature To for control reaches the upper limit value of 80° C., and the target heating-medium temperature Two reaches the upper limit value of 82° C. (see FIG. 3).

During the operation after the operation has started since Time t0, because the temperature Tw of the heating medium is lower than the target value Two and the cooling medium temperature Tref is lower than the target value Trefo, the mode is switched to a high power mode in which the auxiliary heating device 43 and the refrigeration cycle 2 are operated. In this high power mode, the heating medium circulating through the heating cycle 4 is heated by the auxiliary heating device 43 and the refrigeration cycle 2, and thereby, the amount of heat received by the heating medium can be increased, and so, the cabin heating can be performed rapidly.

At Time t1, as the temperature Tw of the heating medium is increased to exceed the threshold value of 62° C., the mode is switched to a refrigeration-cycle stop mode. In this refrigeration-cycle stop mode, in order to prevent the refrigeration cycle 2 from reaching the low-efficiency state, the operation of the refrigeration cycle 2 is stopped and only the auxiliary heating device 43 is operated. By doing so, the temperature Tw of the heating medium is gradually decreased after it has been increased continuously from the high power mode and reached the peak temperature.

At Time t2, as the temperature Tw of the heating medium becomes lower than the threshold value of 62° C., the operation of the refrigeration cycle 2 is started again, and the mode is switched to the high power mode in which the auxiliary heating device 43 and the refrigeration cycle 2 are operated. In this high power mode, as the target blowout temperature To and the target heating-medium temperature Two are decreased gradually, the output of the auxiliary heating device 43 is reduced, and output contribution by the refrigeration cycle 2 is increased gradually.

At Time t3, as the temperature Tw of the heating medium reaches the target heating-medium temperature Two, the mode is switched to a high efficiency mode in which the auxiliary heating device 43 is stopped and only the refrigeration cycle 2 is operated. In this high efficiency mode, only the refrigeration cycle 2 having higher efficiency than the auxiliary heating device 43 is operated, and the cabin heating is performed while suppressing the electric power consumption.

As described above, in the time chart shown in FIG. 7, the operation is performed in the high power mode from Time t0 to t1, the operation is performed in the refrigeration-cycle stop mode from Time t1 to t2, the operation is performed again in the high power mode from Time t2 to t3, and the operation is performed in the high efficiency mode after Time t3.

With the air-conditioning device 1 according to the above-mentioned embodiment, following effects can be achieved.

The air-conditioning device 1 includes: the heating cycle 4 configured to circulate the heating medium through the heater core 42, the heater core 42 being configured to heat the blown air; the auxiliary heating device 43 configured to heat the heating medium by an electric heater; the refrigeration cycle 2 configured to circulate the cooling medium discharged from the compressor 21 through the condenser 22, the condenser 22 being configured to heat the heating medium; and the controller 10 configured to control the operations of the refrigeration cycle 2 and the auxiliary heating device 43. The controller 10 has a configuration including: the refrigeration cycle control means configured to operate the refrigeration cycle 2 such that the temperature Tw of the heating medium reaches the target heating-medium temperature Two; the auxiliary heating device control means configured to operate the auxiliary heating device 43 such that the temperature Tw of the heating medium reaches the target heating-medium temperature Two; and the switching means configured to stop the operation of the refrigeration cycle 2 when it is determined that the low-efficiency state in which the efficiency of the refrigeration cycle 2 is lower than a predetermined value is occurred.

In addition, the air-conditioning device 1 is configured such that, while the temperature Tw of the heating medium is increased, the mode is switched to the high power mode in which the auxiliary heating device 43 and the refrigeration cycle 2 are operated on the basis of the temperature Tw of the heating medium, and thereafter, the mode is switched to the refrigeration-cycle stop mode in which the operation of the refrigeration cycle 2 is stopped and only the auxiliary heating device 43 is operated.

According to the above-mentioned configuration, with the air-conditioning device 1, in the process of an increase in the temperature Tw of the heating medium, in the case in which the heating performed only by the refrigeration cycle 2 cannot sufficiently provide the amount of heat required to allow the temperature Tw of the heating medium to reach the target heating-medium temperature Two within a predetermined period when the temperature Tw of the heating medium is low, the auxiliary heating device 43 and the refrigeration cycle 2 are operated. By doing so, the amount of heat received by the heating medium can be increased, and so, the cabin heating can be performed rapidly. In the case in which the refrigeration cycle 2 reaches the low-efficiency state in which the efficiency of the refrigeration cycle 2 is decreased as the temperature Tw of the heating medium is increased, the operation of the refrigeration cycle 2 is stopped, and the cabin heating is performed by the operation of the auxiliary heating device 43. As described above, with the air-conditioning device 1, the cabin heating is performed rapidly, and because the refrigeration cycle 2 is prevented from reaching the low-efficiency state in which the efficiency of the refrigeration cycle 2 is decreased, the cabin heating is performed with high efficiency.

In addition, the switching means is configured so as to stop the operation of the refrigeration cycle 2 when it is determined that the low-efficiency state is occurred when the temperature Tw of the heating medium is equal to or higher than the threshold value of 62° C.

According to the above-mentioned configuration, the refrigeration cycle 2 is operated such that the compression ratio of the cooling medium by the compressor 21 does not exceed the upper limit value. By doing so, it is possible to set the target heating-medium temperature Two such that the compression ratio of the cooling medium by the compressor 21 exceeds the upper limit value, and so, at the cabin-heating starting time when the outside temperature is low, for example, the operation of the refrigeration cycle 2 is stopped and the temperature Tw of the heating medium can be increased by the heating performed only by the auxiliary heating device 43, thereby performing the cabin heating rapidly.

In addition, the auxiliary heating device control means is configured to stop the operation of the auxiliary heating device 43 in the case in which the amount of heat required to allow the temperature Tw of the heating medium to reach the target heating-medium temperature Two is achieved by the heating performed only by the refrigeration cycle 2.

According to the above-mentioned configuration, in the process of an increase in the temperature Tw of the heating medium, in the case in which the heating performed only by the refrigeration cycle 2 can sufficiently provide the amount of heat required to allow the temperature Tw of the heating medium to reach the target heating-medium temperature Two within a predetermined period, the operation of the auxiliary heating device 43 is stopped and only the refrigeration cycle 2 is operated, thereby suppressing the electric power consumption.

In addition, the controller 10 includes: target-heating-medium-temperature calculating means configured to calculate the target heating-medium temperature Two based on the target blowout temperature To of the blown air; and target-cooling-medium-temperature calculating means configured to calculate the target cooling medium temperature Trefo based on the target heating-medium temperature Two. The refrigeration cycle control means is configured to control the operation of the refrigeration cycle 2 such that the temperature Tref of the cooling medium (the pressure of the cooling medium) discharged from the compressor 21 approaches the target cooling medium temperature Trefo, and the auxiliary heating device control means is configured to control the operation of the auxiliary heating device 43 such that the temperature Tw of the heating medium approaches the target heating-medium temperature Two.

According to the above-mentioned configuration, in the air-conditioning device 1, the refrigeration cycle 2 is operated on the basis of the cooling medium temperature Tref (the pressure of the cooling medium), and the auxiliary heating device 43 is operated on the basis of the temperature Tw of the heating medium, and thereby, the cabin heating is performed efficiency on the basis of the operation condition.

In addition, the target heating-medium temperature Two is set to a lower value with respect to the target cooling medium temperature Trefo.

According to the above-mentioned configuration, when the temperature T of the blown air approaches the target blowout temperature Ttarget in the high power mode, even after the temperature Tw of the heating medium has reached the target heating-medium temperature Two and the auxiliary heating device is stopped, the cooling medium temperature Tref does not reach the target cooling medium temperature Trefo, and the mode is switched to the high efficiency mode in which only the refrigeration cycle 2 is operated.

A description has been given of the air-conditioning device 1 shown in FIGS. 1 to 7 in the above. Next, a modification of the air-conditioning device 1 shown in FIGS. 8 to 10 will be described.

As shown in a table in FIG. 8, with the controller 10 of the air-conditioning device 1 according to this modification, the threshold value of 62° C. is set for the target heating-medium temperature Two that determines whether or not the operation of the refrigeration cycle 2 is to be started. The controller 10 is configured to stop the operation of the refrigeration cycle 2 in the case in which the target heating-medium temperature Two is equal to or higher than the threshold value of 62° C. and to start the operation of the refrigeration cycle 2 when it is determined that the target heating-medium temperature Two is decreased to the temperature below the threshold value of 62° C. By doing so, in the operating state in which there is a possibility that the temperature Tw of the heating medium is increased to exceed the threshold value of 62° C., because the operation of the refrigeration cycle 2 is stopped, the cooling medium temperature Tref is increased to exceed a predetermined value (67° C.) and the refrigeration cycle 2 is prevented from reaching the low-efficiency state.

In the controller 10, the threshold value of 62° C. for the temperature Tw of the heating medium at which a determination is made to stop the operation of the refrigeration cycle 2 is set. The controller 10 is configured such that the operation of the refrigeration cycle 2 is prohibited when it is determined that the temperature Tw of the heating medium is increased to exceed the threshold value of 62° C.

Figure 9:
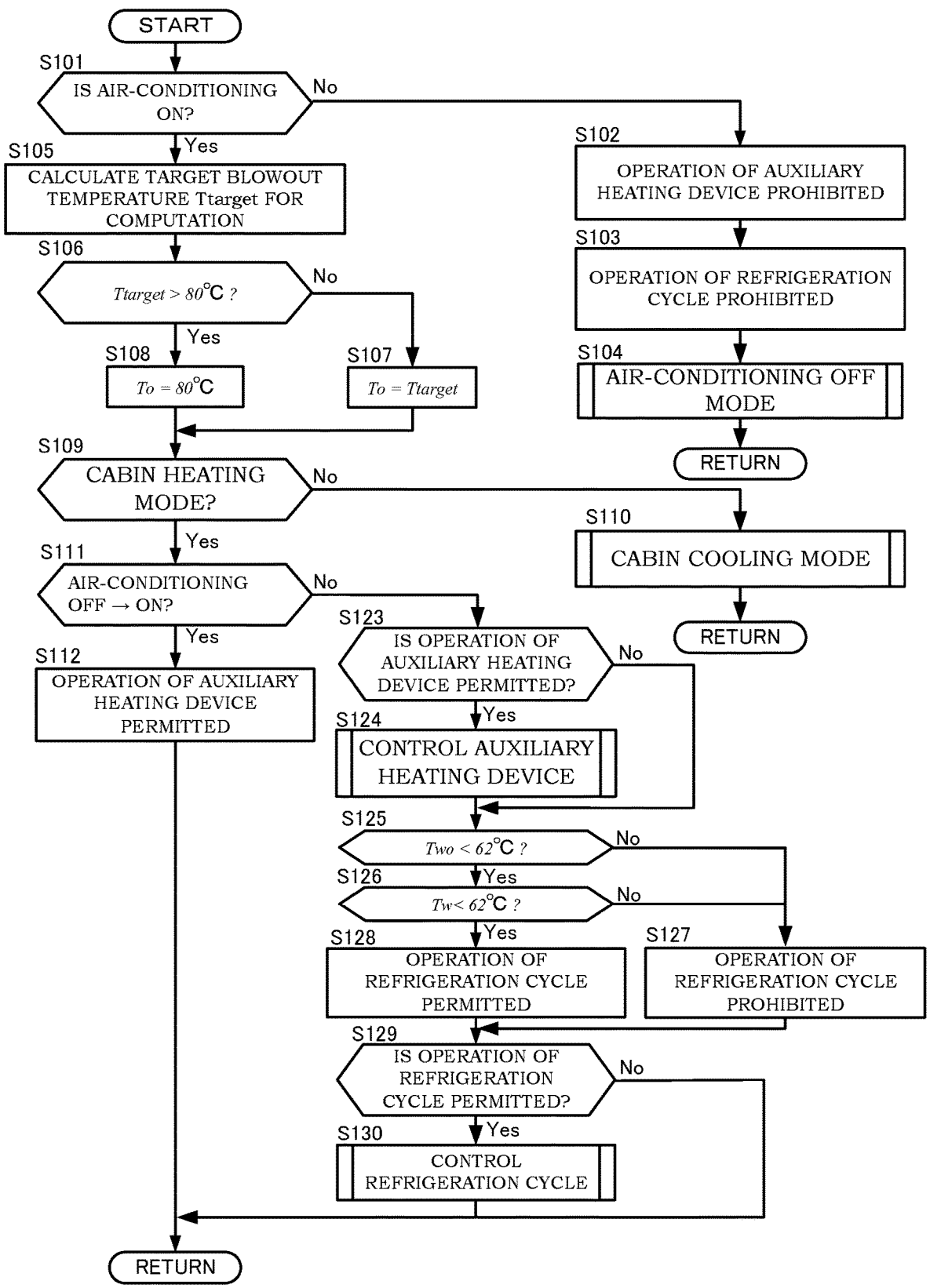
FIG. 9 is a flowchart showing control processing for switching the operation modes of the air-conditioning device.

Next, a routine for switching the operation mode of the air-conditioning device 1 that is executed by the controller 10 will be described by using a flowchart showing shown in FIG. 9.

In the cabin heating mode, the processing proceeds to Step S111, and it is determined whether or not it is the cabin-heating starting time at which the air-conditioning OFF mode is switched to an air-conditioning ON mode. In the air-conditioning OFF mode, the operation of the air-conditioning device 1 is stopped. In an air-conditioning ON mode, the air-conditioning device 1 is operated. When it is determined that it is the cabin-heating starting time, the processing proceeds to Step S112, and the operation of the auxiliary heating device 43 is permitted.

On the other hand, when it is determined that it is the cabin-heating time by which the cabin heating has already been started in Step S111, the processing proceeds to Step S123 to determine whether or not the operation of the auxiliary heating device 43 is permitted, and the processing proceeds to Step S124 to control the operation of the auxiliary heating device 43 (see FIG. 5).

Next, the processing proceeds to Step S125, and it is determined whether or not the target heating-medium temperature Two is lower than the threshold value of 62° C. When it is determined that the target heating-medium temperature Two is equal to or higher than the threshold value of 62° C., the processing proceeds to Step S127, and the operation of the refrigeration cycle 2 is prohibited. By doing so, the refrigeration cycle 2 is prevented from reaching the low-efficiency state. On the other hand, when it is determined that the target heating-medium temperature Two is lower than the threshold value of 62° C., the processing proceeds to Step S126.

The configuration is not limited to those described above, and in Step S123, it may be determined whether or not the target blowout temperature To is lower than the threshold value of 60° C. When it is determined that the target blowout temperature To is equal to or higher than the threshold value of 60° C., the processing proceeds to Step S127, and the operation of the refrigeration cycle 2 is prohibited. By doing so, the refrigeration cycle 2 is also prevented from reaching the low-efficiency state. On the other hand, when it is determined that the target blowout temperature To is lower than the threshold value of 60° C., the processing proceeds to Step S126.

In Step S126, it is determined whether or not the temperature Tw of the heating medium is lower than the threshold value (62° C.). When it is determined that the temperature Tw of the heating medium is equal to or higher than the threshold value (62° C.), the processing proceeds to Step S127, and the operation of the refrigeration cycle 2 is prohibited.

On the other hand, when it is determined that the temperature Tw of the heating medium is lower than the threshold value (62° C.) in Step S126, the processing proceeds to Step S128, and the operation of the refrigeration cycle 2 is permitted.

Next, the processing proceeds to Step S129 to determine whether or not the operation of the compressor 21 is permitted, and the processing proceeds to Step S130 to control the operation of the refrigeration cycle 2 (see FIG. 6).

By executing the above-mentioned control routine, in the air-conditioning device 1, the operation mode is switched on the basis of the operation condition.

Next, an operation performed in the case in which the operation of the air-conditioning device 1 is started when the outside temperature is low will be described by using a time chart shown in FIG. 10.

At Time t0 in the time chart, the operation of the air-conditioning device 1 is started in the cabin heating mode. At the time of starting the operation, because the blowout temperature T of the blown air and the temperature Tw of the heating medium are both low, high cabin heating power is required. In order to cope with such a situation, the target blowout temperature Ttarget for computation is set so as to be a value higher than the upper limit value of 80° C. However, the target blowout temperature To for control reaches the upper limit value of 80° C., and the target heating-medium temperature Two reaches the upper limit value of 82° C. (see FIG. 8).

During the operation after the operation has started since Time t0, the refrigeration-cycle stop mode is selected as it is determined that the target heating-medium temperature Two is equal to or higher than the threshold value of 62° C. In the refrigeration-cycle stop mode, the operation of the refrigeration cycle 2 is prohibited, and the auxiliary heating device 43 is operated. In the refrigeration-cycle stop mode, as the temperature Tw of the heating medium is increased while the heating medium circulating through the heating cycle 4 is heated by the auxiliary heating device 43, the target blowout temperature To and the target heating-medium temperature Two are gradually decreased. Thus, the temperature Tw of the heating medium is gradually decreased after it has been increased to exceed 62° C. and reached the peak.

At Time t1, as the target heating-medium temperature Two becomes lower than the threshold value of 62° C., the mode is switched to the high power mode. In the high power mode, as the operation of the refrigeration cycle 2 is started, the auxiliary heating device 43 and the refrigeration cycle 2 are both operated. In the high power mode, as the target blowout temperature To and the target heating-medium temperature Two are decreased gradually, the output of the auxiliary heating device 43 is reduced, and the output contribution by the refrigeration cycle 2 is increased gradually.

At Time t2, as the temperature Tw of the heating medium reaches the target heating-medium temperature Two, the mode is switched to the high efficiency mode. In the high efficiency mode, the auxiliary heating device 43 is stopped, and only the refrigeration cycle 2 having higher efficiency than the auxiliary heating device 43 is operated. Thereby, the cabin heating is performed while suppressing the electric power consumption.

As described above, in the time chart shown in FIG. 10, the operation is performed in the refrigeration-cycle stop mode from Time t0 to t1, the operation is performed in the high power mode from Time t1 to t2, and the operation is performed in the high efficiency mode after Time t2.

Figure 10:
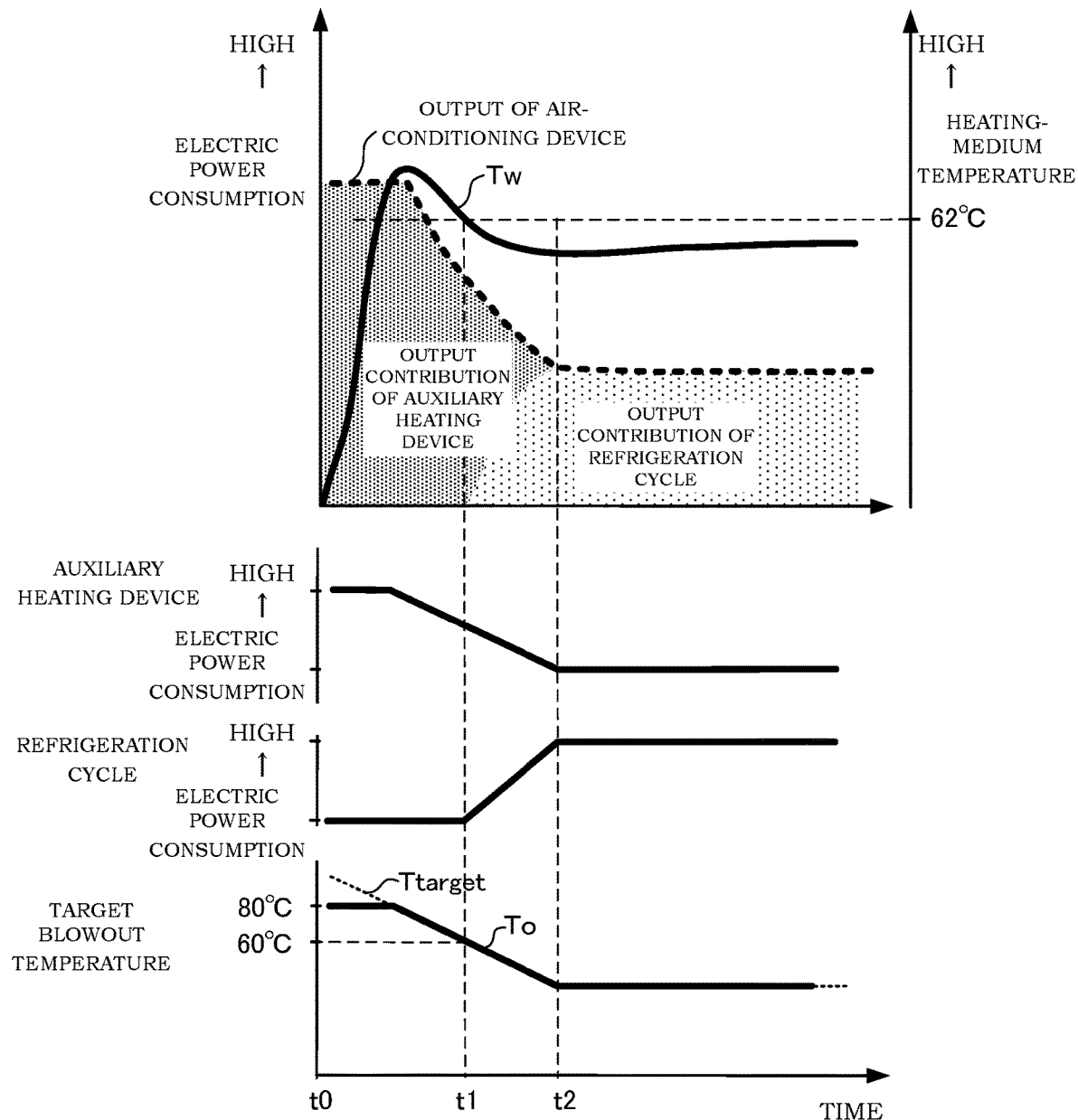
FIG. 10 is a time chart showing an exemplary control of the air-conditioning device.

Although it is not illustrated in the time chart in FIG. 10, in the case in which the temperature Tw of the heating medium is increased to exceed the threshold value of 62° C. when the operation is performed in the high power mode, the mode is switched to the refrigeration-cycle stop mode. In the refrigeration-cycle stop mode, in order to prevent the refrigeration cycle 2 from reaching the low-efficiency state, the operation of the refrigeration cycle 2 is stopped and only the auxiliary heating device 43 is operated.

As described above, the controller 10 according to this modification is configured to include: the refrigeration cycle control means configured to operate the refrigeration cycle 2 such that the temperature Tw of the heating medium reaches the target heating-medium temperature Two; the auxiliary heating device control means configured to operate the auxiliary heating device 43 such that the temperature Tw of the heating medium reaches the target heating-medium temperature Two; and the switching means configured to start the operation of the refrigeration cycle 2 in the case in which the target heating-medium temperature Two is decreased to the temperature below the threshold value of 62° C.

According to the above-mentioned configuration, with the air-conditioning device 1, in the case in which the target heating-medium temperature Two is equal to or higher than the threshold value of 62° C. (in the case in which the target blowout temperature To is equal to or higher than the threshold value of 60° C.), the operation of the refrigeration cycle 2 is stopped and only the auxiliary heating device 43 is operated. By doing so, it is possible to set the target heating-medium temperature Two such that the compression ratio of the cooling medium by the compressor 21 exceeds the upper limit value. Therefore, at the cabin-heating starting time when the outside temperature is low, for example, the temperature Tw of the heating medium can be increased by the operation of the auxiliary heating device 43 without being affected by the state of the refrigeration cycle 2.

On the other hand, in the case in which the target heating-medium temperature Two is decreased to the temperature below the threshold value of 62° C. (in the case in which the target blowout temperature To is decreased to the temperature below the threshold value of 60° C.) as the temperature Tw of the heating medium is increased, the operation of the refrigeration cycle 2 is started, and the amount of heat received by the heating medium can be increased.

As described above, with the air-conditioning device 1, the cabin heating is performed rapidly, and because the refrigeration cycle 2 is prevented from reaching the low-efficiency state in which the efficiency of the refrigeration cycle 2 is decreased, the cabin heating is performed with high efficiency.

In addition, the air-conditioning device 1 is configured such that, in the process of an increase in the temperature Tw of the heating medium, the mode is switched to the refrigeration-cycle stop mode in which the operation of the refrigeration cycle 2 is stopped and only the auxiliary heating device 43 is operated, and thereafter, the mode is switched to the high power mode in which the auxiliary heating device 43 and the refrigeration cycle 2 are operated.

According to the above-mentioned configuration, with the air-conditioning device 1, because the operation is performed in the refrigeration-cycle stop mode at the beginning of the cabin heating with requirement of the rapid cabin heating, the temperature Tw of the heating medium can be increased without being affected by the state of the refrigeration cycle 2. Thereafter, by switching the mode to the high power mode, the amount of heat received by the heating medium can be increased, and so, the cabin heating can be performed rapidly.

Although the embodiment of the present invention has been described above, the above-mentioned embodiment is only an illustration of a part of application examples of the present invention, and there is no intention to limit the technical scope the present invention to the specific configuration of the above-mentioned embodiment.

Although the present invention is suitable as the air-conditioning device to be mounted on a vehicle, the present invention may also be applied to the air-conditioning device used for other purposes than the vehicles.

This application claims priority based on Japanese Patent Application No. 2016-049850 filed with the Japan Patent Office on Mar. 14, 2016, and Japanese Patent Application No. 2016-049859 filed with the Japan Patent Office on Mar. 14, 2016, the entire contents of which are incorporated into this specification.

The invention claimed is:

1. An air-conditioning device comprising:
   a heating cycle configured to circulate heating medium through a heater core, the heater core being configured to heat blown air;
   an auxiliary heating device configured to heat the heating medium by an electric heater;
   a refrigeration cycle configured to circulate cooling medium discharged from a compressor through a condenser, the condenser being configured to heat the heating medium;
   refrigeration cycle control means configured to operate the refrigeration cycle such that temperature of the heating medium reaches target heating-medium temperature;
   an auxiliary heating device control means configured to operate the auxiliary heating device such that the temperature of the heating medium reaches the target heating-medium temperature;
   switching means configured to stop the operation of the refrigeration cycle in a state in which the temperature of the heating medium is equal to or higher than a threshold value;
   target-heating-medium-temperature calculating means configured to calculate the target heating-medium temperature based on target blowout temperature of blown air, the target blowout temperature being set based on operating condition; and
   target-cooling-medium-temperature calculating means configured to calculate target cooling medium temperature based on the target heating-medium temperature, wherein
   the refrigeration cycle control means is configured to control the operation of the refrigeration cycle such that temperature of the cooling medium discharged from the compressor approaches the target cooling medium temperature, and
   the auxiliary heating device control means is configured to control the operation of the auxiliary heating device such that the temperature of the heating medium approaches the target heating-medium temperature.

2. The air-conditioning device according to claim 1, wherein in process of an increase in the temperature of the heating medium, a mode is switched to a high power mode in which the auxiliary heating device and the refrigeration cycle are operated, and thereafter, the mode is switched to a refrigeration-cycle stop mode in which operation of the refrigeration cycle is stopped and only the auxiliary heating device is operated.

3. The air-conditioning device according to claim 1, wherein
the switching means is configured so as to start the operation of the refrigeration cycle in a case in which the target heating-medium temperature is decreased to temperature below the threshold value.

4. The air-conditioning device according to claim 3, wherein
in process of an increase in the temperature of the heating medium, after the refrigeration-cycle stop mode in which the operation of the refrigeration cycle is stopped and only the auxiliary heating device is operated is performed, the high power mode in which the auxiliary heating device and the refrigeration cycle are operated is performed.

5. The air-conditioning device according to claim 1, wherein
the auxiliary heating device control means is configured to stop operation of the auxiliary heating device in a case in which heating performed only by the refrigeration cycle can sufficiently provide amount of heat required to allow the temperature to reach the target heating-medium temperature.

6. The air-conditioning device according to claim 1, wherein
the target heating-medium temperature is set to a lower value with respect to the target cooling medium temperature.

* * * * *